United States Patent [19]

Rikimaru et al.

[11] Patent Number: 5,582,809
[45] Date of Patent: Dec. 10, 1996

[54] CATALYST AND METHOD FOR DENITRIZATION OF NITROGEN OXIDES

[75] Inventors: Hiroaki Rikimaru; Toshikatsu Umaba; Yoshiyuki Yoshikawa, all of Osaka, Japan

[73] Assignees: Sakai Chemical Industry Co., Ltd.; Mitsubishi Jukogyo Kabushiki Kaisha, both of Japan

[21] Appl. No.: 277,041

[22] Filed: Jul. 19, 1994

[30] Foreign Application Priority Data

Jul. 20, 1993 [JP] Japan ..................... 5-179467

[51] Int. Cl.$^6$ .............................. B01J 8/00; C01B 21/00
[52] U.S. Cl. .................. 423/239.1; 502/309; 502/311
[58] Field of Search ................ 423/239.1; 502/309, 502/311

[56] References Cited

U.S. PATENT DOCUMENTS

| | | | |
|---|---|---|---|
| 4,085,193 | 4/1978 | Nakajima et al. | 423/239 |
| 4,131,643 | 12/1978 | Utsunomiya et al. | 423/239 |
| 4,221,768 | 9/1980 | Inoue et al. | 423/239 |
| 4,518,710 | 5/1985 | Brennan | 502/309 |
| 4,916,107 | 4/1990 | Brand et al. | 502/309 |
| 5,198,403 | 3/1993 | Brand et al. | 502/204 |

FOREIGN PATENT DOCUMENTS

| | | |
|---|---|---|
| 0317875A2 | 5/1989 | European Pat. Off. . |
| 0385164A2 | 9/1990 | European Pat. Off. . |

OTHER PUBLICATIONS

*Patent Abstract of Japan*, vol. 014, No. 232 (C-0719) (May 1990) (Abstract of JP-A-02 056 250).
*Database WPI*, Section Ch, Week 8106 (Dec. 1990) AN 81-08883D (Abstract of JP-A-55 155 740).
*Database WPI*, Section Ch, Week, 8725 (May 1987) AN 87-174713 (Abstract of JP-A-62 106 826).

*Primary Examiner*—Asok Pal
*Assistant Examiner*—Bekir L. Yildirim
*Attorney, Agent, or Firm*—Wenderoth, Lind & Ponack

[57] ABSTRACT

A catalyst for reducing nitrogen oxides into nitrogen and water in the presence of a reducing agent, which comprises:
(a) titanium;
(b) at least one element selected from the group consisting of tungsten and molybdenum in a total amount of 10–25% by weight in terms of oxides; and
(c) niobium in an amount of 0.1–2% by weight in terms of oxides.

2 Claims, No Drawings

CATALYST AND METHOD FOR DENITRIZATION OF NITROGEN OXIDES

FIELD OF THE INVENTION

This invention relates to a catalyst and a method for reducing nitrogen oxides contained in waste gases such as combustion waste gases or waste gases from chemical plants in the presence of a reducing agent such as ammonia. More particularly, the invention relates to a catalyst and a method for reducing nitrogen oxides stably and effectively into nitrogen and water over a long period of time even at a temperature as high as more than about 500° C.

Nitrogen oxides are contained in combustion waste gases from boilers, heating furnaces, gas turbines or diesel engines or waste gases from chemical plants for producing of such as nitric acid. The nitrogen oxides are noxious and it is necessary to remove the oxides from the waste gases. Thus, a denitrizing process has been put to practical use wherein the waste gas is contacted with a catalyst in the presence of, for example, ammonia as a reducing agent.

Description of the Prior Art

A number of catalysts have been proposed and put to practical use heretofor, however, all the known catalysts have effective activity for reducing of nitrogen oxides only at a relatively low temperature region. There has been found out no catalyst which has high and stable activity over a wide range of temperatures, low to high, such as more than 500° C., for a long period of time. However, such a catalyst is in fact needed in some fields of denitrization.

For instance, when a gas turbine or diesel engine is started, the resultant exhaust gas reaches rapidly a high temperature, and such a catalyst as above mentioned is needed to denitrize such an exhaust gas effectively and stably.

It is already known that a catalyst mainly composed of titanium and tungsten is fairly resistant to heat, as disclosed in Japanese Patent Publication No. 52-35342. However, the catalyst is found to have a low activity at a low temperature region, and moreover it is found not to have a stable activity over a long period.

A catalyst consisting of titanium and vanadium is known, as disclosed in Japanese Patent Publication No. 54-2912, whereas a catalyst consisting of titanium, tungsten and vanadium is also known, as disclosed in Japanese Patent Application Laid-open No. 50-128681. These catalysts have fairly good reduction activity for nitrogen oxides at a low temperature region, however, they are found not to have a stable activity at a high temperature region.

A further catalyst is known which contains at least one element selected from titanium, copper, chromium, tungsten, molybdenum, iron and nickel, in addition to vanadium and niobium, as disclosed in Japanese Patent Application Laid-open No. 51-87485. This catalyst is also found not to have a stable activity at a high temperature region.

BRIEF SUMMARY OF THE INVENTION

It is an object of the invention to provide a catalyst for reducing nitrogen oxides in the presence of a reducing agent exemplified by ammonia which has a high and stable activity over a wide range of from low temperatures to high temperatures, such as more than 500° C., for a long period of time.

It is also an object of the invention to provide a method for reducing nitrogen oxides by use of such a catalyst as above mentioned in the presence of a reducing agent.

The invention provides a catalyst for reducing nitrogen oxides into nitrogen and water in the presence of a reducing agent, which comprises:

(a) titanium;

(b) at least one element selected from the group consisting of tungsten and molybdenum in a total amount of 10–25% by weight in terms of oxides; and (c) niobium in an amount of 0.1–2% by weight in terms of oxides.

DETAILED DESCRIPTION OF THE INVENTION

The nitrogen oxides include dinitrogen oxide, nitrogen monoxide, dinitrogen trioxide, nitrogen dioxide and dinitrogen pentoxide.

The catalyst of the invention contains (a) titanium as a main component usually in the form of titanium dioxide, and in addition, (b) at least one element selected from the group consisting of tungsten and molybdenum in a total amount of 10–25%, preferably in the range of 12–21% by weight, in terms of oxides (i.e., $WO_3$ or $MoO_3$). These components are useful to improve heat resistance of the catalyst.

The catalyst of the invention further contains niobium in an amount of 0.1–2%, preferably in the range of 0.15–1% by weight, in terms of oxides (i.e., $Nb_2O_5$). The niobium is useful to improve the activity for reducing nitrogen oxides at a low temperature region without adversely affecting the activity at a high temperature region. The presence of niobium in an amount of more than 2% by weight in terms of oxides is not desirable since the resultant catalyst excessively accelerates the oxidation of reducing agent such as ammonia.

It is preferred that the catalyst contains all the elements, titanium, tungsten, molybdenum and niobium, in the form of oxides, however, the catalyst may contain at least one of the elements in the form other than oxides, such as sulfates.

The catalyst of the invention may further contain silicon or zirconium, preferably as silica or zirconium oxide, if necessary.

For the production of catalyst of the invention, any compound of the element may be used as raw materials. With regard to a titanium component, titanium dioxide is preferably used, however, titanic acid, titanium hydroxide, titanium sulfate or composite oxides of titanium and silicon may be used, if necessary. The composite oxide of titanium and silicon may be produced by, for example, admixing a titanium salt such as titanium sulfate with silica sol to prepare a mixture, adding an alkali such as ammonia to the mixture whereby forming a precipitate of mixture of oxides, washing and drying the mixture of oxides, and then calcining the mixture of oxides at a temperature of 150°–850° C.

When titanium dioxide is used as a titanium component, the dioxide is such that it is produced as follows. Titanium sulfate is recovered as an intermediate from the production process of titanium dioxide by the sulfuric acid process, neutralized with ammonia, dried, and then calcined. However, if necessary, any titanium dioxide may be used irrespectively of the method by which it is produced.

With regard to a tungsten component, tungsten oxide, ammonium paratungstate or ammonium metatungstate is usually preferred, while with regard to a molybdenum component, molybdenum oxide or ammonium paramolybdate is usually preferred. With regard to a niobium component, chlorides are preferably used.

The catalyst of the invention may be produced in any conventional manner known in the art. For instance, the catalyst may be produced by admixing the individual oxides of the elements and calcining the mixture; forming a coprecipitate of the oxides and calcining the coprecipitate; admixing at least one oxides of the elements with water soluble salts of the other elements, kneading the mixture, and calcining the mixture; coating the oxides on a support or a carrier material; or by any combinations of these methods.

By way of example, titanium sulfate is admixed with niobium chloride, an alkali is added to the mixture to form a coprecipitate, and the coprecipitate is dried and calcined, thereby to provide a mixture of titanium dioxide and niobium oxide. A solution of ammonium metatungstate is then added to the mixture of the oxides, and the resultant mixture is kneaded, molded to a green mold of a desired shape, and then dried and calcined, thereby to provide a molded catalyst.

The catalyst of the invention may be formed into a molded catalyst of any shape, such as a honeycomb structure, pellet or granulate depending upon the use, if necessary by use of a molding assistant such as a polyvinyl alcohol binder, or the molded catalyst may be reinforced with an inorganic fiber reinforcement. Further, the catalyst may be supported on a support or a carrier material composed of, for instance, silica, alumina, magnesia or zirconia, or a mixture of these, as known in the art.

The catalyst of the invention has high and stable activity for reducing nitrogen oxides over a wide range of low temperature to high temperatures, more than 500° C., and is durable.

Further according to the invention, there is provided a method of reducing nitrogen oxides contained in a waste gas which comprises contacting the waste gas with the catalyst as set forth hereinbefore in the presence of a reducing agent at a temperature of 200°–600° C.

The reducing agent used includes, for example, hydrogen, hydrocarbon, carbon monoxide or ammonia, with ammonia being most preferred from the practical standpoint. The reducing agent is used in an amount of 1–10 times, preferably 1–2 times, as much as the stoichiometric amount needed to completely react with the nitrogen oxides in the waste gas. The waste gas is mixed with the reducing gas, and is then contacted with the catalyst fitted in a reactor at a space velocity (NTP) of 2000–100000 per hour, preferably 5000–60000 per hour, at a temperature of 200°–600° C. According to the invention, if the reaction temperature varies in the range of from 200° C. to a temperature as high as more than 500° C., usually not more than 600° C., the nitrogen oxides can be stably and effectively decomposed over a long period of time.

The catalyst and method of the invention is accordingly suitable for use where a waste gas reaches a high temperature such as 500°–600° C. eventually or accidentally during the denitrizing reaction of waste gases.

The reaction is carried out usually under a normal pressure by a fixed bed process, however, if necessary, under an increased pressure, for example, up to about 10 kg/cm$^2$, by a moving bed process or a fluidizing bed process.

The method of the invention is suitably applicable to waste gases from such as power boilers or waste combustion furnaces among others, although not limited to these applications.

The invention will be more easily understood with reference to the following examples. The examples are intended to illustrate the invention only and are not to be construed as limiting the scope of the invention.

EXAMPLE 1

An amount of 940 ml of ethanol solution of niobium chloride ($NbCl_5$) containing niobium in an amount of 50 g/l in terms of $Nb_2O_5$ was added to 200 liters of solution of titanium sulfate containing titanium in an amount of 100 g/l in terms of $TiO_2$ (obtained as an intermediate from the production of titanium oxide by the sulfuric acid process), and the mixture was then neutralized with ammonia water. The resultant precipitate was collected by filtration, washed with water, dried at 120° C. for 12 hours, and then calcined at 500° C. for 3 hours, thereby to provide a mixture of titanium dioxide and niobium oxide. The mixture of the oxides was pulverized and adjusted to a suitable particle size.

An amount of 7.1 kg of solution of ammonium metatungstate containing tungsten in an amount of 50% by weight in terms of $WO_3$ was added to the mixture of the oxides. The resultant mixture was kneaded and then extruded into a grid-like honeycomb mold having a pitch of 4.2 mm by use of an extruder. The mold was dried at 110° C. and then calcined at 600° C. for 3 hours, thereby to provide a catalyst containing 15% by weight of tungsten in terms of tungsten oxide ($WO_3$) and 0.2% by weight of niobium in terms of niobium oxide ($Nb_2O_5$).

EXAMPLE 2

An amount of 2.37 liters of ethanol solution of niobium chloride ($NbCl_5$) containing niobium in an amount of 50 g/l in terms of $Nb_2O_5$ was added to 200 liters of the same solution of titanium sulfate as in Example 1, and the mixture was thermally hydrolyzed at 95° C. The resultant precipitate was collected by filtration, washed with water, dried at 120° C. for 12 hours, and then calcined at 500° C. for 3 hours, thereby to provide a mixture of titanium dioxide and niobium oxide. The mixture of the oxides was pulverized and adjusted to a suitable particle size.

An amount of 7.1 kg of solution of ammonium metatungstate containing tungsten in an amount of 50% by weight in terms of $WO_3$ was added to the mixture of the oxides. The resultant mixture was kneaded and then extruded into a grid-like honeycomb mold having a pitch of 4.2 mm by use of an extruder. The mold was dried at 110° C. and then calcined at 600° C. for 3 hours, thereby to provide a catalyst containing 15% by weight of tungsten in terms of tungsten oxide ($WO_3$) and 0.5% by weight of niobium in terms of niobium oxide ($Nb_2O_5$).

EXAMPLE 3

An amount of 8.9 liters of solution of ammonium paramolybdate containing molybdenum in an amount of 400 g/l in terms of $MoO_3$ was used in liew of the solution of ammonium metatungstate, and otherwise in the same manner as in Example 1, there was prepared a catalyst containing 15% by weight of molybdenum in terms of molybdenum oxide ($MoO_3$) and 0.2% by weight of niobium in terms of niobium oxide ($Nb_2O_5$).

COMPARATIVE EXAMPLE 1

The same solution of titanium sulfate as in Example 1 was neutralized with ammonia water. Otherwise in the same manner as in Example 1, there was prepared a catalyst containing 15% by weight of tungsten in terms of tungsten oxide ($WO_3$).

COMPARATIVE EXAMPLE 2

The same solution of titanium sulfate as in Example 2 was neutralized with ammonia water. Otherwise in the same manner as in Example 2, there was prepared a catalyst containing 15% by weight of tungsten in terms of tungsten oxide ($WO_3$).

COMPARATIVE EXAMPLE 3

An amount of 7.2 kg of solution of ammonium metatungstate containing tungsten in an amount of 50% by weight in terms of $WO_3$ and 1.6 liters of oxalic acid solution of ammonium metavanadate containing vanadium in an amount of 150 g/l in terms of vanadium pentoxide ($V_2O_5$) (i.e., 240 g of vanadium in the solution in terms of $V_2O_5$) were used in lieu of 7.1 kg of solution of ammonium metatungstate, and otherwise in the same manner as in Example 2, there was prepared a catalyst containing 15% by weight of tungsten in terms of tungsten oxide ($WO_3$), 1% by weight of vanadium in terms of vanadium pentoxide ($V_2O_5$) and 0.5% by weight of niobium in terms of niobium pentoxide ($Nb_2O_5$).

COMPARATIVE EXAMPLE 4

An amount of 3.5 kg of solution of ammonium metatungstate containing tungsten in an amount of 50% by weight in terms of $WO_3$ was used, and otherwise in the same manner as in Example 1, there was prepared a catalyst containing 8% by weight of tungsten in terms of tungsten oxide ($WO_3$) and 0.2% by weight of niobium in terms of niobium pentoxide ($Nb_2O_5$).

COMPARATIVE EXAMPLE 5

An amount of 30.8 liters of ethanol solution of niobium chloride ($NbCl_5$) containing niobium in an amount of 50 g/l in terms of $Nb_2O_5$ and 18.5 kg of solution of ammonium metatungstate containing tungsten in an amount of 50% by weight in terms of $WO_3$ was used, and otherwise in the same manner as in Example 1, there was prepared a catalyst containing 30% by weight of tungsten in terms of tungsten oxide ($WO_3$) and 5% by weight of niobium in terms of niobium pentoxide ($Nb_2O_5$).

CATALYTIC REDUCTION OF NITROGEN OXIDES

The thus prepared catalysts were subjected to measurement of activity for reduction of nitrogen oxides (NOx). The catalyst was fitted in a reactor and contacted with a gas mixture at a temperature of 270° C. or 530° C. at a space velocity of 7950 per hr. and at a superficial gas velocity of 2.46 Nm/sec.

Nitrogen oxides: 65 ppm
Ammonia: 65 ppm
Water vapor: 7%
Oxygen: 14.7 %
Nitrogen: Balance The results are indicated in Table 1 in which the denitrizing rate is defined by ((NOx concentration at the inlet of reactor)—(NOx concentration at the outlet of the reactor)/(NOx concentration at the inlet of reactor))×100 (%). The denitrizing rate was measured at the initial stage of the reaction.

TABLE 1

| | Denitrizing Rate (%) | |
|---|---|---|
| | 270° C. | 530° C. |
| Example | | |
| 1 | 90.0 | 92.0 |
| 2 | 90.3 | 92.1 |
| 3 | 90.9 | 91.9 |
| Comparative Example | | |
| 1 | 85.1 | 90.9 |
| 2 | 87.0 | 91.1 |
| 3 | 93.7 | 75.3 |
| 4 | 88.0 | 89.6 |
| 5 | 92.5 | 80.8 |

As indicated in Table 1, the catalyst of the invention has an effective activity for reduction of nitrogen oxides over a wide range of temperatures, and even at a temperature as high as more than 500° C.

After the above measurement, the catalyst was taken out of the reactor and then heated in an electric oven at a temperature more than 500° C. over a period of 6000 hours. The catalyst was then again fitted in the reactor and was then contacted with the same gas mixture as hereinbefore, and the denitrizing rate was measured at the initial stage of the reaction. The results are indicated in Table 2.

TABLE 2

| | Denitrizing Rate (%) | |
|---|---|---|
| | 270° C. | 530° C. |
| Example | | |
| 1 | 89.8 | 89.6 |
| 2 | 90.1 | 89.8 |
| 3 | 90.0 | 89.9 |
| Comparative Example | | |
| 1 | 79.8 | 83.0 |
| 2 | 80.4 | 83.6 |
| 3 | 82.7 | 50.3 |
| 4 | 81.1 | 77.1 |
| 5 | 84.3 | 71.2 |

As indicated in Table 2, the catalyst of the invention has an effective and stable activity for reduction of nitrogen oxides at a high temperature more than 500° C. for a long period of time.

What is claimed is:

1. A method for reducing nitrogen oxides contained in a waste gas into nitrogen and water in the presence of ammonia as a reducing agent, which comprises contacting the waste gas with a catalyst consisting essentially of:
   (a) titanium dioxide;
   (b) at least one oxide selected from the group consisting of tungsten oxide and molybdenum oxide in a total amount of 12–21% by weight;
   (c) niobium oxide in an amount of 0.15–0.5% by weight; and
   (d) optionally silica or zirconium oxide, at a temperature greater than 500° C. to a temperature of not more than 600° C.

2. The method as claimed in claim 1 wherein the element (b) is tungsten.

* * * * *